United States Patent
Shida (10) Patent No.: US 8,660,779 B2
(45) Date of Patent: Feb. 25, 2014

(54) ROW-RUNNING CONTROL SYSTEM AND VEHICLE

(75) Inventor: Mitsuhisa Shida, Fuji (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/143,459

(22) PCT Filed: Jan. 20, 2009

(86) PCT No.: PCT/JP2009/050754
§ 371 (c)(1),
(2), (4) Date: Jul. 6, 2011

(87) PCT Pub. No.: WO2010/084569
PCT Pub. Date: Jul. 29, 2010

(65) Prior Publication Data
US 2011/0270514 A1    Nov. 3, 2011

(51) Int. Cl.
*G06F 19/00*    (2011.01)
(52) U.S. Cl.
USPC ............ 701/117; 701/300; 701/301; 701/422
(58) Field of Classification Search
USPC ........................................................ 701/422
See application file for complete search history.

(56) References Cited

U.S. PATENT DOCUMENTS

| | | | | |
|---|---|---|---|---|
| 5,695,020 A | * | 12/1997 | Nishimura | ..................... 180/169 |
| 5,777,451 A | * | 7/1998 | Kobayashi et al. | ............ 318/587 |
| 6,032,097 A | * | 2/2000 | Iihoshi et al. | ..................... 701/96 |
| 2006/0195250 A1 | | 8/2006 | Kawaguchi | |

FOREIGN PATENT DOCUMENTS

| | | |
|---|---|---|
| JP | A-10-162282 | 6/1998 |
| JP | A-2006-232240 | 9/2006 |
| JP | A-2007-102564 | 4/2007 |

OTHER PUBLICATIONS

International Search Report issued in International Application No. PCT/JP2009/050754 on Mar. 3, 2009 (with translation).
Jun. 21, 2012 Extended Search Report issued in European Patent Application No. 09838761.6.

* cited by examiner

*Primary Examiner* — Behrang Badii
*Assistant Examiner* — Jerrah Edwards
(74) *Attorney, Agent, or Firm* — Oliff PLC (57) ABSTRACT

A vehicle platooning control system is a vehicle platooning control system that controls a relative relationship between vehicles so that a plurality of vehicles runs in a row. In this system, each target value of a relative relationship between vehicles continuous in the longitudinal direction of a row is determined on the basis of a relative relationship error propagation ratio which is a ratio of an error of the relative relationship propagated to the rear vehicles running in the row.

6 Claims, 6 Drawing Sheets

ROW-RUNNING CONTROL SYSTEM AND VEHICLE

TECHNICAL FIELD

The present invention relates to a vehicle platooning control system that controls a relative relationship between vehicles so that a plurality of vehicles runs in a row and a vehicle that includes the system.

BACKGROUND ART

In recent years, a technology of making a plurality of vehicles run in a row with a short vehicle-to-vehicle distance has gained attention in order to improve a traffic flow and improve fuel efficiency with a reduction of air resistance. Hitherto, there has been known a method of controlling a vehicle-to-vehicle distance between a front vehicle and each of subsequent vehicles of a row. In this method, there is a problem in that a vehicle-to-vehicle distance error is propagated to the rear vehicle when the foremost vehicle is disturbed by a slope of a road, a wind, or the like. In order to solve this problem, a system is proposed in JP-A-10-162282. In this system, the row-running of the plurality of vehicles is realized by controlling the vehicle-to-vehicle distance between the foremost vehicle and each of the subsequent vehicles in the row. According to this method, it is considered that the vehicle-to-vehicle distance error is not propagated to the rear vehicle.

PATENT LITERATURE 1

JP-A-10-162282

SUMMARY OF INVENTION

Technical Problem

With regard to the control system, a control method has been proposed for some time which in theory does not generate the propagation of the vehicle-to-vehicle distance error. However, when a plurality of vehicles is made to run in a row in actuality, it is difficult to prevent occurrence of a propagation of an error due to the time wasted due to the vehicle-to-vehicle communication, delayed sensing, and delayed response of the vehicles. When the plurality of vehicles is made to run in a row in actuality using this kind of system, a safety allowance may become smaller particularly as it goes to the rear vehicle or smoothness of movement may deteriorate due to the propagation of the error, which are problems that may not be found theoretically. Therefore, in the row-running, there is a need to conduct the row-running while ensuring a safe vehicle-to-vehicle distance particularly as it moves to the rear vehicle of the row.

Therefore, an object of the invention is to provide a vehicle platooning control system capable of realizing row-running with a safe vehicle-to-vehicle distance and a vehicle.

Solution to Problem

A vehicle platooning control system of the invention is a vehicle platooning control system that controls a relative positional relationship between vehicles so that a plurality of vehicles runs in a row, wherein each target value of a vehicle-to-vehicle distance between vehicles continuous in the longitudinal direction of a row is determined on the basis of a vehicle-to-vehicle error propagation ratio which is a ratio of a vehicle-to-vehicle distance error propagated to the rear vehicles during running in the row.

The vehicle-to-vehicle error of the actual row-running may be propagated to the rear vehicles due to various reasons. According to the vehicle platooning control system, since each target value of the vehicle-to-vehicle distance is determined on the basis of the vehicle-to-vehicle error propagation ratio, the vehicle-to-vehicle distance target value obtained in consideration of the vehicle-to-vehicle error propagation state may be determined, and the row-running with the safe vehicle-to-vehicle distance corresponding to the vehicle-to-vehicle error propagation state may be realized.

Further, in this case, on the assumption that a target vehicle-to-vehicle distance between an n-th vehicle and an n+1-th vehicle from the front side of the row is denoted by $L_{n\_tgt}$ and a maximum value of the vehicle-to-vehicle error propagation ratio is denoted by $S_{max}$, the determined target vehicle-to-vehicle distance $L_{n\_tgt}$ may be expressed by $L_{n\_tgt} = S_{max}^{n-1} \cdot L_{1\_tgt}$.

With this configuration, the row-running may be realized in which the vehicle-to-vehicle distance between vehicles of the row exponentially increases as it goes to the rear side of the row. Accordingly, even when the vehicle-to-vehicle distance error exponentially increases as it goes to the rear side of the row, a safety allowance at the rear vehicles may be ensured. That is, safety allowances in all of the vehicles of the row may be equalized.

Further, an acceleration instruction value of a foremost vehicle in the row may be determined on the basis of frequency characteristics of the vehicle-to-vehicle error propagation ratio. The vehicle-to-vehicle error propagation ratio of the vehicles in the row has frequency characteristics depending on the acceleration frequency of the foremost vehicle. Since the acceleration instruction value of the foremost vehicle is determined in consideration of the frequency characteristics, it is possible to suppress an acceleration of the foremost vehicle increasing the vehicle-to-vehicle error propagation ratio and to suppress a phenomenon in which the vehicle-to-vehicle error increases as it goes to the rear side of the row.

Further, a vehicle of the invention includes any one of the vehicle platooning control systems described above. Since this vehicle includes any one of the vehicle platooning control systems, the row-running with a safe vehicle-to-vehicle distance may be realized. Further, in this case, the vehicle of the invention may be a single vehicle constituting the row.

Advantageous Effects of Invention

According to the vehicle platooning control system and the vehicle of the invention, the row-running may be realized with a safe vehicle-to-vehicle distance.

REFERENCE SIGNS LIST 1, 201: vehicle platooning control system, 51: frequency cut-off filter, $C_1$ to $C_5$: vehicle, $C_1$: foremost vehicle, $C_2$ to $C_5$: subsequent vehicles, $L_{1\_tgt}$ to $L_{5\_tgt}$: target vehicle-to-vehicle distance

DESCRIPTION OF EMBODIMENTS

Hereinafter, exemplary embodiments of a vehicle platooning control system and a vehicle according to the invention will be specifically described by referring to the drawings.

First Embodiment

Figure 1:
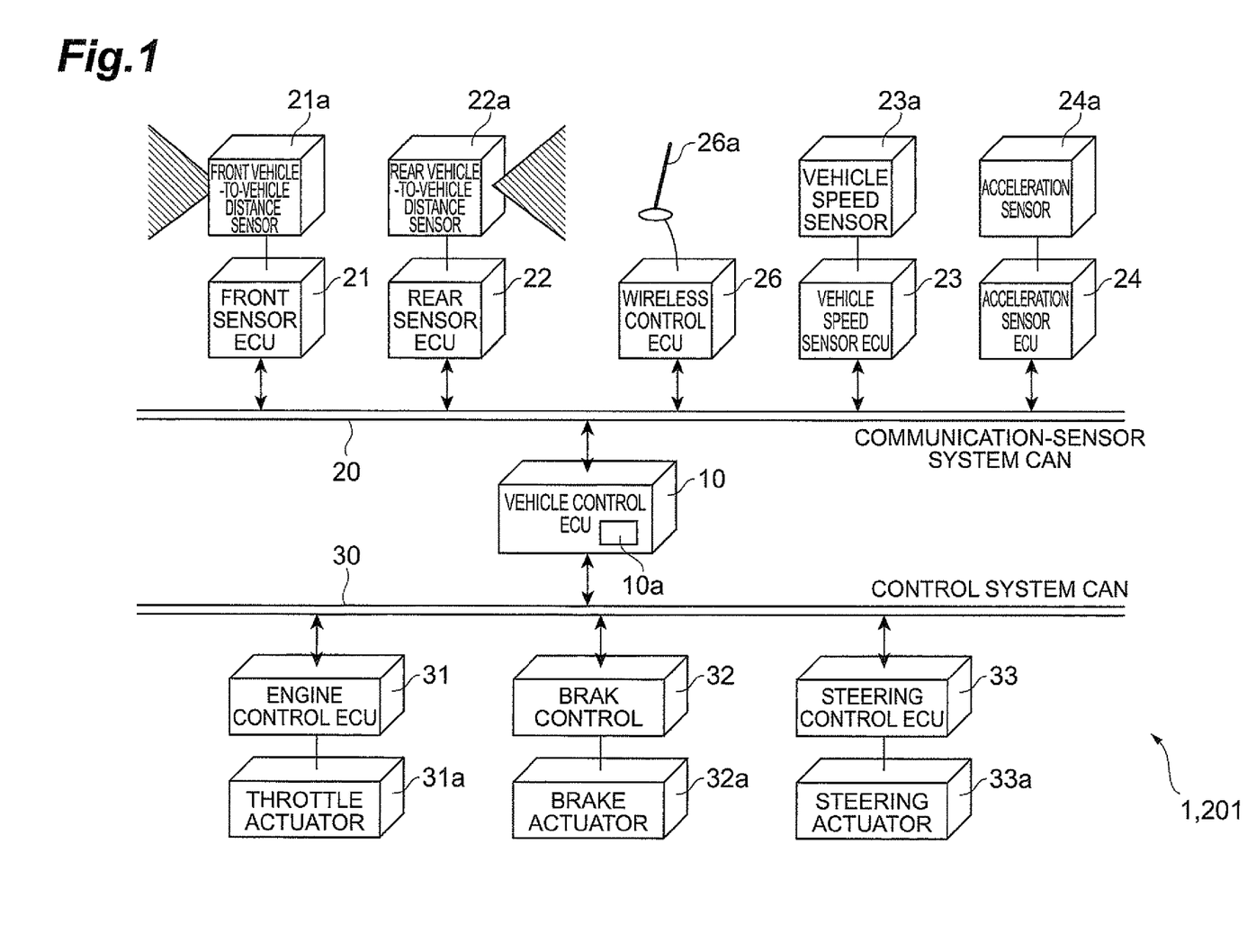
FIG. 1 is a block diagram illustrating first and second embodiments of a vehicle platooning control (row-running control) system according to the invention.

A vehicle platooning control system 1 shown in FIG. 1 is a system that controls each running state of a plurality of vehicles so that the plurality of vehicles runs in a row. By adopting the vehicle platooning control system 1, row-running may be realized in which the plurality of vehicles runs in a row with a comparatively narrow vehicle-to-vehicle distance. In the vehicle platooning control system 1, row-running of an arbitrary number of vehicles may be realized. However, here, as shown in FIG. 2, a case will be exemplified in which five vehicles $C_1$, $C_2$, $C_3$, $C_4$, and $C_5$ run in a row.

Figure 2:
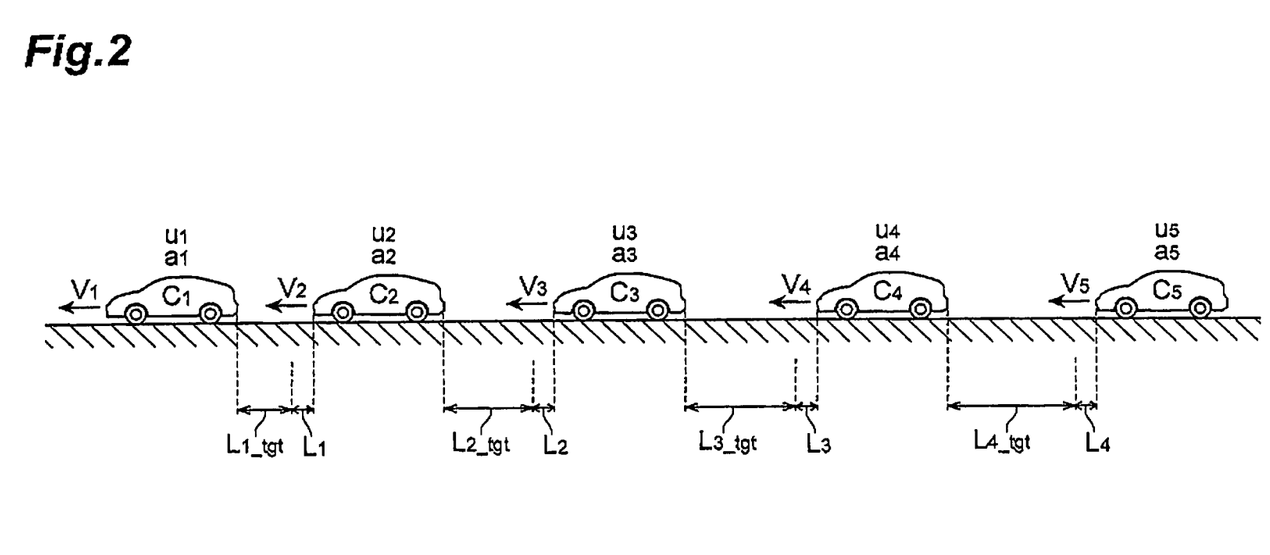
FIG. 2 is a diagram illustrating row-running realized by the vehicle platooning control system shown in FIG. 1.

Furthermore, in the description below, if necessary, as shown in FIG. 2, the acceleration of a vehicle $C_n$ at n-th (n=1, 2, ..., 5) from a foremost vehicle is denoted by "$a_n$", the speed of the vehicle $C_n$ is denoted by "$V_n$", and the acceleration instruction value of the vehicle $C_n$ is denoted by "$u_n$". Further, the target vehicle-to-vehicle distance between the vehicle $C_n$ and the vehicle $C_{n+1}$ is denoted by "$L_{n\_tgt}$", and the vehicle-to-vehicle error between the vehicle $C_n$ and the vehicle $C_{n+1}$ is denoted by "$L_n$". Furthermore, the vehicle-to-vehicle error indicates an error between the target vehicle-to-vehicle distance $L_{n\_tgt}$ and the actual vehicle-to-vehicle distance. Further, in the vehicles $C_1$ to $C_5$ constituting the row, the vehicle $C_1$ running at the foremost position is denoted by a "foremost vehicle", on the other hand the vehicles $C_2$ to $C_5$ are generally denoted by "subsequent vehicles".

Each of the vehicles $C_1$ to $C_5$ in the row is equipped with one vehicle platooning control system 1 to be described later.

As shown in FIG. 1, the vehicle platooning control system 1 includes a vehicle control ECU (Electronic Control Unit) 10. The vehicle control ECU 10 is an electronic control unit that entirely controls the vehicle platooning control system 1, and includes, for example, a computer including a CPU, a ROM, and a RAM. The vehicle control ECU 10 includes an information storage unit 10a that may store information for a short term or a long term.

Furthermore, the vehicle platooning control system 1 includes sensors that detect a running state of a host vehicle. The sensors includes a front vehicle-to-vehicle distance sensor 21a, a rear vehicle-to-vehicle distance sensor 22a, a vehicle speed sensor 23a, and an acceleration sensor 24a.

The front vehicle-to-vehicle distance sensor 21a may detect the vehicle-to-vehicle distance between the host vehicle and the vehicle running directly in front of the host vehicle. In the same manner, the rear vehicle-to-vehicle distance sensor 22a may detect the vehicle-to-vehicle distance between the host vehicle and the vehicle running directly to the rear of the host vehicle. As the front vehicle-to-vehicle distance sensor 21a and the rear vehicle-to-vehicle distance sensor 22a, for example, millimeter-wave radars respectively provided at the front and rear portions of the vehicle may be adopted. The signal acquired from the front vehicle-to-vehicle distance sensor 21a is processed at the front sensor ECU 21, and is transmitted to the vehicle control ECU 10 as front vehicle-to-vehicle distance information. In the same manner, the signal acquired from the rear vehicle-to-vehicle distance sensor 22a is processed at the rear sensor ECU 22, and is transmitted to the vehicle control ECU 10 as rear vehicle-to-vehicle distance information.

The vehicle speed sensor 23a may detect the speed of the host vehicle. As the vehicle speed sensor 23a, for example, an electromagnetic pickup sensor detecting a speed of a wheel is used. The signal acquired at the vehicle speed sensor 23a is processed at the vehicle speed sensor ECU 23, and is transmitted to the vehicle control ECU 10 as vehicle speed information. As the acceleration sensor 24a, for example, a gas rate sensor or a gyro sensor is used. The signal acquired at the acceleration sensor 24a is processed at the acceleration sensor ECU 24, and is transmitted to the vehicle control ECU 10 as acceleration information.

Furthermore, the front sensor ECU 21, the rear sensor ECU 22, the vehicle speed sensor ECU 23, and the acceleration sensor ECU 24 are connected to the vehicle control ECU 10 via a communication-sensor system CAN 20 built as an invehicle network.

As described above, in the vehicle platooning control system 1, front vehicle-to-vehicle distance information, rear vehicle-to-vehicle distance information, vehicle speed information, and acceleration information for the host vehicle are acquired by the above-described group of sensors. Furthermore, in the description below, the front vehicle-to-vehicle distance information, the rear vehicle-to-vehicle distance information, the vehicle speed information, and the acceleration information may be integrally referred to as "running state information".

Furthermore, the system 1 includes an engine control ECU 31, a brake control ECU 32, and a steering control ECU 33 in order to carry out an operation of increasing/decreasing the speed of the host vehicle or steering the host vehicle. The engine control ECU 31 receives acceleration instruction value information transmitted from the vehicle control ECU 10, and operates a throttle actuator 31a or the like with an operation amount corresponding to the acceleration instruction value. Further, the brake control ECU 32 receives the acceleration instruction value information, and operates the brake actuator 32a or the like with the operation amount corresponding to the acceleration instruction value. Further, the steering control ECU 33 receives steering instruction value information transmitted from the vehicle control ECU 10, and operates the steering actuator 33a or the like with the operation amount corresponding to the steering instruction value.

Further, the vehicle platooning control system 1 includes a wireless antenna 26a and a wireless control ECU 26 in order to exchange running state information or the like between the host vehicle and another vehicle constituting the row. Each of the vehicles $C_1$ to $C_5$ in the row performs mutual vehicle-to-vehicle communication by using the wireless antenna 26a and the wireless control ECU 26, acquires all vehicle specification information, running state information, and acceleration instruction value information of another vehicle constituting the row, and transmits vehicle specification information, running state information, and acceleration instruction value information of the host vehicle to the other vehicle. By adopting the vehicle-to-vehicle communication, in the vehicle control ECUs 10 of the vehicles $C_1$ to $C_5$, all vehicle specification information, running state information, and acceleration instruction value information of the vehicles $C_1$ to $C_5$ may be shared. Furthermore, the wireless control ECU 26 is connected to the vehicle control ECU 10 via the above-described communication-sensor system CAN 20.

Next, the row-running control using the vehicle platooning control system 1 will be described.

Here, it is assumed that the foremost vehicle $C_1$ is manually operated by a driver and the vehicle platooning control systems 1 respectively control the running states of four subsequent vehicles $C_2$ to $C_5$ in order to follow the foremost vehicle $C_1$ manually operated by the driver. Further, it is assumed that a control is performed so that the vehicle-to-vehicle distance between the front vehicle $C_{n-1}$ and the host vehicle $C_n$ is fed back via a PD control by feeding forward the actual acceleration $a_{n-1}$ of the front vehicle $C_{n-1}$ exchanged by the vehicle-to-vehicle communication in the four subsequent vehicles $C_2$ to $C_5$.

When the row-running is performed in accordance with the control method, error propagation may be supposed in which the vehicle-to-vehicle errors $L_1$ to $L_4$ are sequentially propagated backward in the row due to the reasons such as the time wasted due to vehicle-to-vehicle communication, delayed sensing, and delayed response of the vehicles. Then, when the vehicle-to-vehicle error propagation ratio sequentially propagated to the rear vehicle-to-vehicle distance, that is, the ratio $L_{n+1}/L_n$ of the vehicle-to-vehicle error $L_{n+1}$ and the vehicle-to-vehicle error $L_n$ is denoted as a vehicle-to-vehicle error propagation ratio (steering stability) S, the vehicle-to-vehicle error propagation ratio S is dependent on the acceleration frequency of the vehicle. For example, a relationship of FIG. 3 is established between the vehicle-to-vehicle error propagation ratio S and the acceleration frequency of the vehicle.

Figure 3:
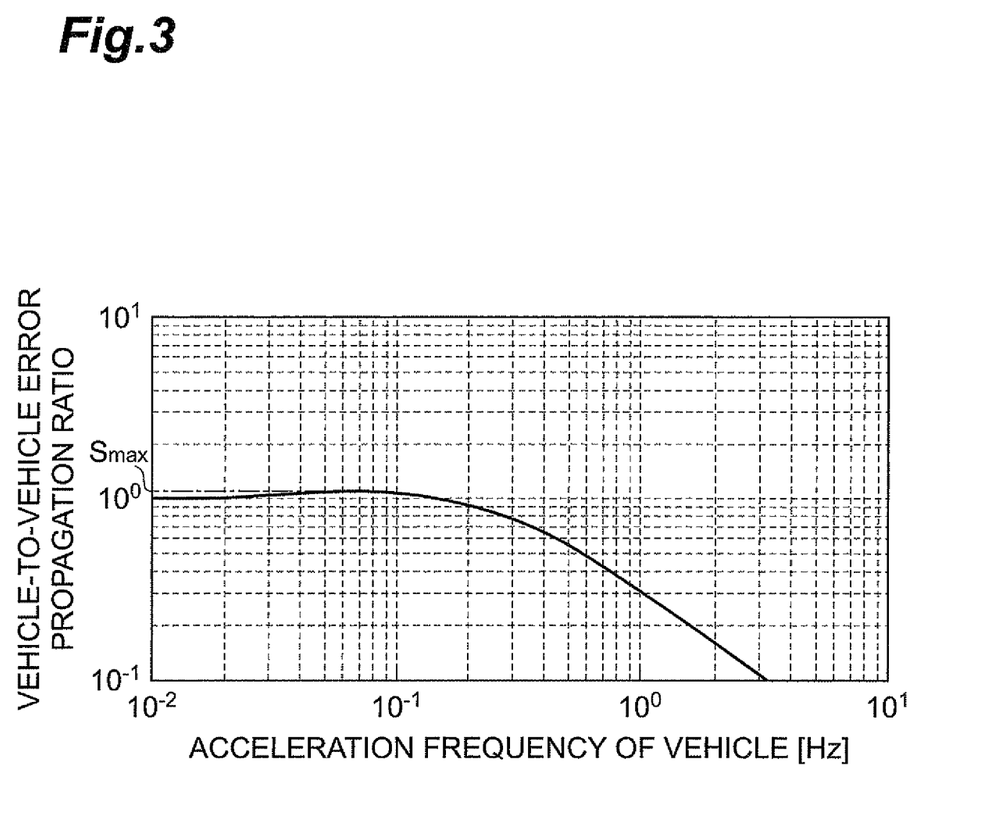
FIG. 3 is a graph illustrating an example of a relationship between an acceleration frequency of a vehicle and a vehicle-to-vehicle error propagation ratio.
Figure 4:
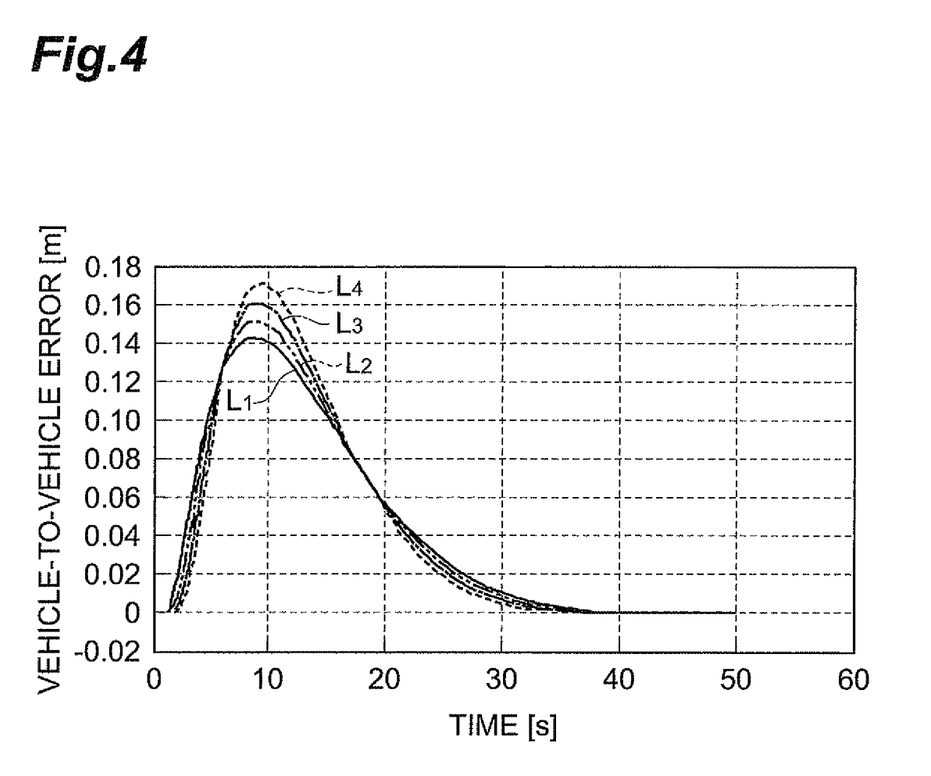
FIG. 4 is a graph illustrating an example of vehicle-to-vehicle error propagation characteristics in which a vehicle-to-vehicle error is propagated to subsequent vehicles of a row.

In the case of the example of FIG. 3, it can be understood that the vehicle-to-vehicle error propagation ratio S becomes maximal when the acceleration frequency of the vehicle is about $6 \cdot 10^{-2}$ Hz and the maximum value $S_{max}$ of the vehicle-to-vehicle error propagation ratio exceeds 1 and becomes about 1.2. When the foremost vehicle $C_1$ increases or decreases speed with a frequency in which the vehicle-to-vehicle error propagation ratio S becomes more than 1, as shown in FIG. 4, the vehicle-to-vehicle error increases as it goes to the rear side of the row so that the error exponentially increases.

In this manner, when a plurality of vehicles is made to run in a row in actuality, a safety allowance may become smaller as it goes to the rear vehicle or smoothness of movement may deteriorate due to the propagation of the error, which are problems that may not be found in theory. Accordingly, in the row-running, there is a need for the vehicle located closer to the rear side of the row to run with a safe vehicle-to-vehicle distance. Therefore, in the vehicle platooning control system 1, the row control is performed so that the vehicle-to-vehicle distance becomes longer as it goes to the rear side of the row. Specifically, when the vehicles constituting the row are denoted by vehicles $C_1$ to $C_{m+1}$, the target vehicle-to-vehicle distances $L_{1\_tgt}$ to $L_{m\_tgt}$ of the row-running control are determined on the basis of the following equation (1).

$$L_{m\_tgt} = S_{max} \cdot L_{m-1\_tgt} = S_{max}^2 \cdot L_{m-2\_tgt} = \ldots = S_{max}^{m-1} \cdot L_{1\_tgt} \qquad (1)$$

As can be understood from the equation (1), when $S_{max}$ is set to a value of 1 or more, the target vehicle-to-vehicle distance exponentially increases as it goes to the rear side of the row. Accordingly, even when the vehicle-to-vehicle error exponentially increases as it goes to the rear side of the row, the vehicle-to-vehicle distance exponentially increases in the same manner. Even at the rear vehicle, the same safety allowance as that of the front vehicle is ensured. That is, the safety allowances of the vehicles $C_1$ to $C_{m+1}$ become equalized. Therefore, according to the vehicle platooning control system 1, the row-running may be realized with a safe vehicle-to-vehicle distance in the entire row.

Figure 5:
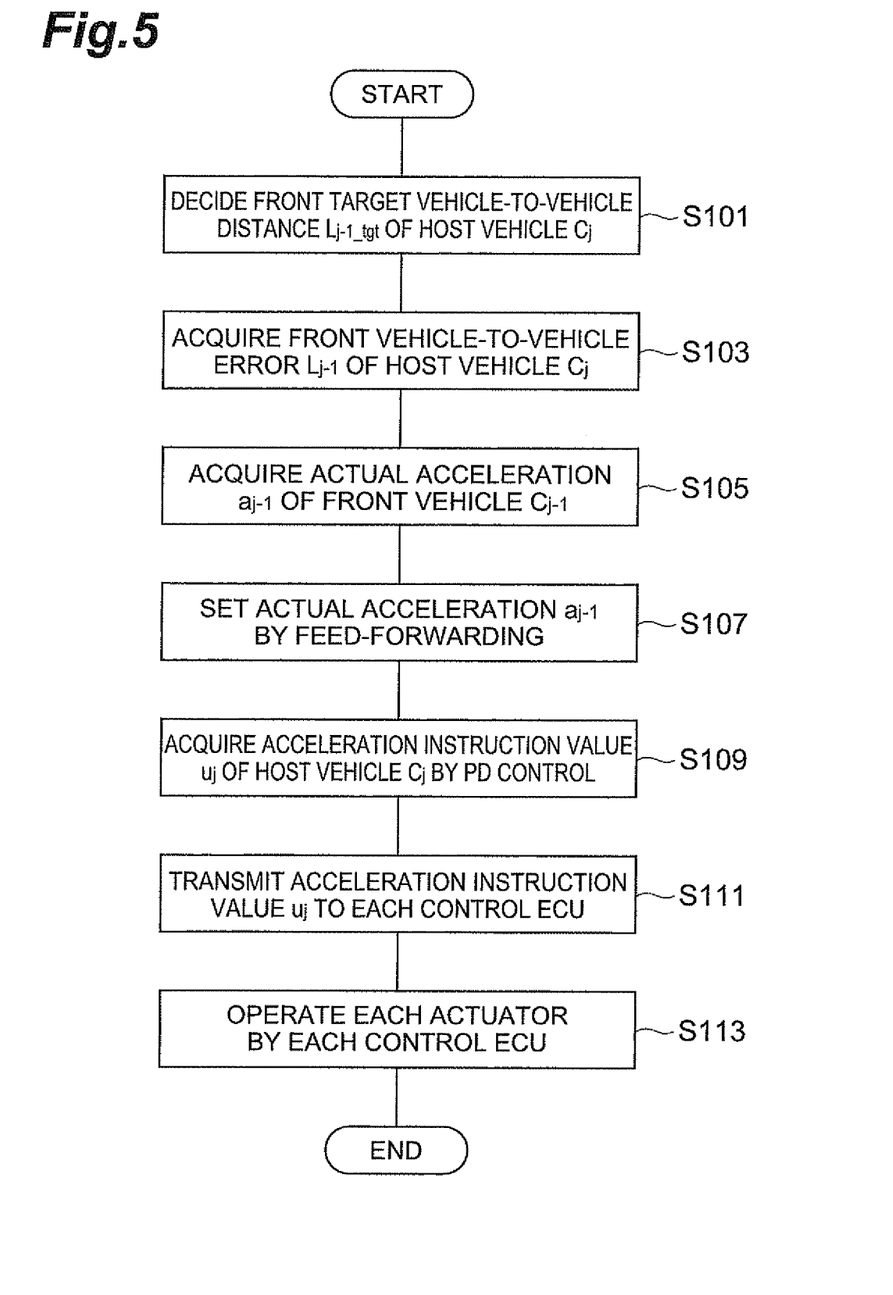
FIG. 5 is a flowchart illustrating a process using the vehicle platooning control system.

In order to realize the row-running, each of the vehicle platooning control systems 1 of the subsequent vehicles $C_2$ to $C_5$ independently controls the increasing or decreasing speed of each host vehicle. Hereinafter, the process performed by the vehicle platooning control system 1 in the vehicle $C_j$ (j=2, 3, 4, and 5) located at the j-th position in the row of five vehicles $C_1$ to $C_5$ will be described by referring to the flowchart of the drawing.

First, the vehicle control ECU 10 of the vehicle platooning control system 1 calculates $L_{4\_tgt} = S_{max} \cdot L_{3\_tgt} = S_{max}^2 \cdot L_{2\_tgt} = S_{max}^3 \cdot L_{1\_tgt}$ that is derived from Equation (1), and decides the front target vehicle-to-vehicle distance $L_{j-1\_tgt}$ of the host vehicle $C_j$ (S101). The maximum value $S_{max}$ of the vehicle-to-vehicle error propagation ratio is set in advance in consideration of the reasons such as the time wasted due to vehicle-to-vehicle communication, delayed sensing, and delayed response of the vehicles by the designer of the vehicle platooning control system 1, and is stored in advance in the information storage unit 10a of the vehicle control ECU 10. For example, when the reasons such as the time wasted due to vehicle-to-vehicle communication, delayed sensing, and delayed response of the vehicles are taken into consideration, the value of about $S_{max} = 1.2$ may be supposed. Further, the value of the target vehicle-to-vehicle distance $L_{1\_tgt}$ may be automatically acquired in accordance with all conditions of the row-running, or may be determined by the manual input from the driver of any one of the vehicles $C_1$ to $C_5$. Furthermore, the process S101 of deciding the target vehicle-to-vehicle distance $L_{j-1\_tgt}$ may not be performed at every time, but may be performed only once at a timing at which the order (where the host vehicle is located in the row) of the host vehicle $C_j$ in the row is determined.

Next, the vehicle control ECU 10 acquires the actual vehicle-to-vehicle distance between the host vehicle $C_j$ and the front vehicle $C_{j-1}$ from the front vehicle-to-vehicle distance sensor 21a as feed-back. Then, the front vehicle-to-vehicle error $L_{j-1}$ of the host vehicle $C_j$ is acquired by calculating a difference between the actual vehicle-to-vehicle distance and the target vehicle-to-vehicle distance $L_{j-1\_tgt}$ (S103). Further, the vehicle control ECU 10 acquires the actual acceleration $a_{j-1}$ of the front vehicle $C_{j-1}$ by the vehicle-to-vehicle communication using the wireless antenna 26a (S105). Furthermore, at this time, a process is also performed which transmits the actual acceleration $a_j$ of the host vehicle $C_j$ obtained from the acceleration sensor 24a to the rear vehicle $C_{j+1}$. Then, the acceleration instruction value $u_j$ of the host vehicle $C_j$ is acquired via a PD control using the vehicle-to-vehicle error $L_{j-1}$ (S109) by feed forwarding the acquired actual acceleration $a_{j-1}$ (S107).

Subsequently, the vehicle control ECU 10 transmits the calculated acceleration instruction value $u_j$ to the engine control ECU 31 and the brake control ECU 32 (S111). Then, the engine control ECU 31 operates the throttle actuator 31a on the basis of the received acceleration instruction value $u_j$, and the brake control ECU 32 operates the brake actuator 32a on the basis of the received acceleration instruction value $u_j$ (S113). The processes of S101 to S113 of FIG. 5 are repeated at each of the subsequent vehicles $C_2$ to $C_5$ during the row-running. Then, by performing these processes, the increasing or decreasing speed of each of four subsequent vehicles $C_2$ to $C_5$ is controlled in response to the foremost vehicle $C_1$, and the row-running is realized in which the vehicle-to-vehicle distance exponentially increases as it goes to the rear side of the row.

Second Embodiment

Next, a second embodiment of the vehicle platooning control system according to the invention will be described. Since the physical configuration of a vehicle platooning control system 201 of the embodiment is the same as that of the vehicle platooning control system 1 as shown in FIG. 1, the repetitive description thereof will be omitted.

As described above, in this kind of row-running, since the vehicle-to-vehicle error propagation ratio S is dependent on the acceleration frequency of the vehicle, there is an acceleration frequency of the vehicle making the vehicle-to-vehicle error propagation ratio S as S>1. For example, in the example of FIG. 3, the frequency around $6 \cdot 10^{-2}$ Hz corresponds thereto. Likewise, the acceleration frequency of the vehicle making the vehicle-to-vehicle error propagation ratio S as S>1 will be referred to as an "inappropriate frequency". As described above, when the foremost vehicle $C_1$ increases or decreases speed with the appropriate frequency, the vehicle-to-vehicle error exponentially increases as it goes to the rear side of the row, which is not desirable from the viewpoint of safety.

Figure 6:
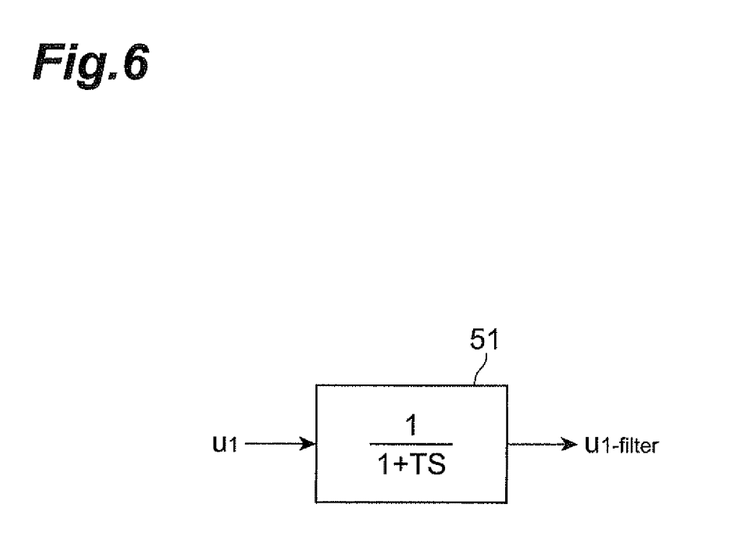
FIG. 6 is a diagram illustrating a frequency cut-off filter provided in the vehicle platooning control system of the second embodiment.

Therefore, in the vehicle platooning control system 201 of the embodiment, a control of preventing the host vehicle from increasing or decreasing the speed with the inappropriate frequency when the host vehicle becomes the foremost vehicle $C_1$ is performed in addition to the control of the vehicle platooning control system 1. That is, when the host vehicle becomes the foremost vehicle $C_1$, a frequency cut-off filter is adopted which suppresses the acceleration of the host vehicle $C_1$ by decreasing the gain at the inappropriate frequency. Specifically, as shown in FIG. 6, for example, an acceleration instruction value $u_1$ generated on the basis of a pedal operation performed by the driver is converted into an acceleration instruction value $u_{1\_filter}$ via the frequency cut-off filter 51, and the acceleration instruction value $u_{1\_filter}$ is transmitted to the engine control ECU 31 and the brake control ECU 32.

Then, the engine control ECU 31 operates the throttle actuator 31a on the basis of the received acceleration instruction value $u_{1\_filter}$, and the brake control ECU 32 operates the brake actuator 32a on the basis of the received acceleration instruction value $u_{1\_filter}$. As a result, the host vehicle $C_1$ increases the speed at the acceleration $a_{1\_filter}$ obtained via the filter. In this manner, the host vehicle $C_1$ does not increase or decrease the speed with the inappropriate frequency via the frequency cut-off filter 51. Accordingly, it is possible to prevent a problem that the vehicle-to-vehicle error increases as it goes to the rear side of the row and to further ensure the safety.

The frequency cut-off filter 51 is actually provided as a part of a calculation equation used in the row-running control program, and the function of the frequency cut-off filter 51 is realized by executing the row-running control program using the vehicle control ECU 10. The calculation equation corresponding to the frequency cut-off filter 51 is determined in advance by the designer of the vehicle platooning control system 201 on the basis of the frequency characteristics of the vehicle-to-vehicle error propagation ratio S, and is stored in advance in the information storage unit 10a of the vehicle control ECU 10. Furthermore, as the frequency cut-off filter 51 for decreasing the gain at the inappropriate frequency, as shown in FIG. 6, a linear delay filter in which the transfer function is expressed by $1/(1+Ts)$ is appropriate.

Next, a case will be described in which a control is performed so that the vehicle-to-vehicle distance between the front vehicle $C_{n-1}$ and the host vehicle $C_n$ is fed back via a PD control by feed forwarding the acceleration instruction value $u_{n-1}$ of the front vehicle $C_{n-1}$ exchanged by the vehicle-to-vehicle communication to the subsequent vehicles $C_2$ to $C_5$. In this case, the foremost vehicle $C_1$ needs to transmit the acceleration instruction value for feed forwarding to the subsequent vehicles $C_2$ to $C_5$ by the vehicle-to-vehicle communication, but the acceleration instruction value transmitted from the foremost vehicle to the subsequent vehicles $C_2$ to $C_5$ becomes the acceleration instruction value $u_{1\_filter}$ after the conversion by the frequency cut-off filter 51.

In this manner, the foremost vehicle $C_1$ may perform filtering on the acceleration instruction value transmitted to the subsequent vehicles $C_2$ to $C_5$ by the vehicle-to-vehicle communication. Even by the filtering, in the same manner as above, it is possible to prevent a problem that the vehicle-to-vehicle error increases as it goes to the rear side of the row and to further ensure the safety. Furthermore, the acceleration instruction value transmitted to the engine control ECU 31 and the brake control ECU 32 in the foremost vehicle $C_1$ in this case may be the acceleration instruction value $u_1$ not subjected to the filtering or may be the acceleration instruction value $u_{1\_filter}$ subjected to the filtering.

Furthermore, the invention is not limited to the first and second embodiments of the invention. For example, in the embodiments, the foremost vehicle $C_1$ is manually operated by the driver, and the running states of the subsequent vehicles $C_2$ to $C_5$ are controlled by the vehicle platooning control system. However, the invention may also be applied to a vehicle platooning control system that controls all of the vehicles of the row including the foremost vehicle $C_1$. Further, in the embodiments, a control is performed so that the vehicle-to-vehicle distance between the front vehicle $C_{n-1}$ and the host vehicle $C_n$ is fed back via a PD control by feed forwarding the actual acceleration $a_{n-1}$ of the front vehicle $C_{n-1}$ to the subsequent vehicles $C_2$ to $C_5$. However, the invention may be applied to a vehicle platooning control system in which the row-running is realized by a different type of control. For example, the invention may be applied when deciding the target vehicle-to-vehicle distance $L_{1\_tgt}$ to $L_{m\_tgt}$ in a vehicle platooning control system that optimally controls (LQ-controls) the increasing or decreasing speed of all of the vehicles of the row on the basis of the amount of the states including the vehicle-to-vehicle errors $L_1$ to $L_m$ or the like.

Further, in the embodiments, a case has been described in which five vehicles $C_1$ to $C_5$ run in a row, but it is obvious that an arbitrary number of vehicles may run in a row without being restricted to five vehicles when imitating the row-running control of the embodiment.

INDUSTRIAL APPLICABILITY

The present invention relates to a vehicle platooning control system that controls each running state of a plurality of vehicles so that the plurality of vehicles runs in a row and realizes row-running with a safe vehicle-to-vehicle distance.

The invention claimed is:

1. A vehicle platooning control system that controls a relative positional relationship between vehicles so that a plurality of vehicles runs in a row, the vehicle platooning control system comprising:
an electronic control unit having control logic configured to cause the electronic control unit to determine a target value of a vehicle-to-vehicle distance between vehicles continuous in the longitudinal direction of a row on the basis of a vehicle-to-vehicle error propagation ratio which is a ratio of a vehicle-to-vehicle error propagated to the rear vehicles during running in the row; wherein
the vehicle-to-vehicle error indicates an error between the target vehicle-to-vehicle distance and an actual vehicle-to-vehicle distance; and
the vehicle-to-vehicle error between an n-th vehicle and an n+1-th vehicle from a front side of the row is denoted by $L_n$, and the vehicle-to-vehicle error propagation ratio S is expressed by $S=L_{n+1}/L_n$.

2. The vehicle platooning control system according to claim 1, wherein the vehicles constituting the row are denoted by vehicles $C_1$ to $C_{m+1}$ from the front side, the target vehicle-to-vehicle distance between vehicles $C_m$ and $C_{m+1}$ is denoted by $L_{m\_tgt}$, a maximum value of the vehicle-to-vehicle error propagation ratio is denoted by $S_{max}$, and the determined target vehicle-to-vehicle distance $L_{m\_tgt}$ is expressed by $L_{m\_tgt}=S_{max}^{m-1} \cdot L_{1\_tgt}$.

3. The vehicle platooning control system according to claim 1, wherein the electronic control unit controls an acceleration instruction value of a foremost vehicle in the row to prevent an acceleration frequency from making the vehicle-to-vehicle error propagation ratio S as S>1.

4. A vehicle comprising:
a vehicle platooning control system that controls a relative positional relationship between vehicles so that a plurality of vehicles runs in a row, the vehicle platooning control system comprising:
an electronic control unit having control logic configured to cause the electronic control unit to determine a target value of a vehicle-to-vehicle distance between vehicles continuous in the longitudinal direction of a row on the basis of a vehicle-to-vehicle error propagation ratio which is a ratio of a vehicle-to-vehicle error propagated to the rear vehicles during running in the row; wherein
the vehicle-to-vehicle error indicates an error between the target vehicle-to-vehicle distance and an actual vehicle-to-vehicle distance; and
the vehicle-to-vehicle error between an n-th vehicle and an n+1-th vehicle from a front side of the row is denoted by $L_n$, and the vehicle-to-vehicle error propagation ratio S is expressed by $S=L_{n+1}/L_n$.

5. The vehicle according to claim 4, wherein the vehicles constituting the row are denoted by vehicles $C_1$ to $C_{m+1}$ from the front side, the target vehicle-to-vehicle distance between vehicles $C_m$ and $C_{m+1}$ is denoted by $L_{m\_tgt}$, a maximum value of the vehicle-to-vehicle error propagation ratio is denoted by $S_{max}$, and the determined target vehicle-to-vehicle distance $L_{m\_tgt}$ is expressed by $L_{m\_tgt}=S_{max}^{m-1} \cdot L_{1\_tgt}$.

6. The vehicle according to claim 4, wherein the electronic control unit controls an acceleration instruction value of a foremost vehicle in the row to prevent an acceleration frequency from making the vehicle-to-vehicle error propagation ratio S as S>1.

* * * * *